United States Patent
Vu et al.

(10) Patent No.: US 9,416,874 B2
(45) Date of Patent: Aug. 16, 2016

(54) TRANSMISSION SYSTEM WITH CLUTCH BITE POINT LEARNING LOGIC

(71) Applicant: GM GLOBAL TECHNOLOGY OPERATIONS LLC, Detroit, MI (US)

(72) Inventors: David H. Vu, East Lansing, MI (US); Xuefeng Tim Tao, Northville, MI (US); Jayson S. Schwalm, Farmington Hills, MI (US); Craig J. Hawkins, Howell, MI (US); Jeryl McIver, Inkster, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 212 days.

(21) Appl. No.: 14/313,063

(22) Filed: Jun. 24, 2014

(65) Prior Publication Data
US 2015/0369364 A1 Dec. 24, 2015

(51) Int. Cl.
*F16H 61/688* (2006.01)
*F16D 48/06* (2006.01)

(52) U.S. Cl.
CPC .............. *F16H 61/688* (2013.01); *F16D 48/06* (2013.01); *F16D 2500/1045* (2013.01); *F16D 2500/10412* (2013.01); *F16D 2500/3026* (2013.01); *F16D 2500/3067* (2013.01); *F16D 2500/30425* (2013.01); *F16D 2500/30806* (2013.01); *F16D 2500/5045* (2013.01); *F16D 2500/50236* (2013.01); *F16D 2500/50281* (2013.01); *F16D 2500/50287* (2013.01); *F16D 2500/7041* (2013.01); *F16D 2500/70264* (2013.01); *F16D 2500/70605* (2013.01); *F16D 2500/70626* (2013.01); *F16H 2342/042* (2013.01)

(58) Field of Classification Search
None
See application file for complete search history.

(56) References Cited

U.S. PATENT DOCUMENTS

| | | | | |
|---|---|---|---|---|
| 5,737,979 A | * | 4/1998 | McKenzie | F16H 61/061 74/731.1 |
| 6,213,911 B1 | * | 4/2001 | Salecker | B60W 10/02 477/174 |
| 2005/0257632 A1 | * | 11/2005 | Runde | F16H 61/061 73/865.9 |

* cited by examiner

*Primary Examiner* — Edwin A Young
(74) *Attorney, Agent, or Firm* — Quinn Law Group, PLLC

(57) ABSTRACT

A method for learning the bite point of a position-controlled clutch in a vehicle having an engine and a transmission includes commanding an engagement of a clutch fork via a controller when the transmission is in park and the engine is idling. The method also includes controlling an apply position of the clutch via the controller, calculating a clutch torque capacity of the clutch, and measuring the apply position via a position sensor. The apply position is recorded as the clutch bite point when the calculated clutch torque capacity equals a calibrated clutch torque capacity. The transmission is then controlled using the recorded clutch bite point. A system includes the transmission, input clutches, and a controller configured to execute the method. A vehicle includes an engine, the transmission, the position-controlled input clutch, and the controller, as well as a clutch position sensor.

16 Claims, 3 Drawing Sheets

TRANSMISSION SYSTEM WITH CLUTCH BITE POINT LEARNING LOGIC

TECHNICAL FIELD

The present disclosure relates to a transmission system with clutch bite point learning logic.

BACKGROUND

Vehicle transmissions use friction clutches to transfer torque between rotating members, and to thereby achieve a desired speed ratio. The clutches of an automatic transmission are typically pressure-controlled, while those of a dual-clutch transmission (DCT) or an automated manual transmission (AMT) are typically position-controlled. Unlike pressure-controlled clutches that are controlled via hydraulic pressure commands, position-controlled clutches are controlled to a specific actuator position via clutch position commands, with each actuator position having a corresponding torque capacity as determined via a calibrated torque-to-position curve or lookup table. Logic translates a commanded clutch position into a corresponding commanded clutch torque. Accurate knowledge of the torque-to-position characteristics of a given clutch is essential to optimum powertrain control.

SUMMARY

A method is disclosed herein for accurately learning the clutch bite point of a position-controlled input clutch in a vehicle having a transmission and an engine. The term "bite point" as used herein refers to a travel position of a clutch apply device, typically a clutch piston or other linear actuator, corresponding to a calibrated torque capacity. The calibrated torque capacity is the torque capacity required by the input clutch to begin to engage and transmit torque. Ultimately, the learned clutch bite point is recorded in memory and subsequently used by the controller to control the transmission.

The method may be automatically executed via a controller when the vehicle is stationary, such as when a PRNDL lever of the vehicle is set to a park state and the engine is idling. Bite point learning by the controller according to the present method may occur as either a first-time learning process that is conducted within the manufacturing plant during a vehicle assembly process, as a service-based process, or whenever conditions permit such testing.

In executing the bite point learning logic embodying the method, a powertrain of the vehicle is effectively used as a dynamometer. That is, the driveline places a load on the engine, and the engine in turn provides the necessary input torque for conducting the bite point test described herein. Use of the method is ultimately intended to provide an accurate initial value for the clutch bite point, and thus a more consistent initial shift quality and creep/launch performance.

The transmission controlled via the method may be any transmission design utilizing a position-controlled clutch of the type noted above. Example transmission embodiments include dry and wet/lubricated dual-clutch transmissions (DCTs), as well as automated manual transmissions (AMTs).

An example method for learning the bite point includes commanding an engagement of a clutch fork in the transmission via a controller when the transmission is in a park state and the engine is idling, and controlling an apply position of the position-controlled clutch via the controller. The method also includes calculating a clutch torque capacity of the position-controlled clutch while controlling the apply position, and measuring the apply position via a position sensor when the calculated clutch torque capacity equals a calibrated clutch torque capacity. Additionally, the method includes recording the measured apply position in memory of the controller, wherein the recorded measured apply position is the clutch bite point, and thereafter controlling the transmission using the clutch bite point.

Controlling the clutch apply position may include using proportional-integral-derivative (PID) control logic of the controller to thereby increase or decrease a linear position of a clutch piston or other clutch actuator. Calculating the clutch torque capacity may include computing this value as a function of a reported engine torque, e.g., by subtracting an inertial torque value from the reported engine torque to produce the calculated clutch torque capacity.

A system for a vehicle having an engine is also disclosed. In an embodiment, the system includes a position-controlled input clutch, a position sensor positioned with respect to the input clutch, a transmission, and a controller. The transmission has gear sets that are selected via a corresponding clutch fork, and also includes an input member that is selectively connected to the engine via the input clutch. The controller is programmed to learn the bite point of the input clutch, and thus to execute instructions from memory to perform the steps of the above-described method.

The above features and advantages and other features and advantages of the present invention are readily apparent from the following detailed description of the best modes for carrying out the invention when taken in connection with the accompanying drawings.

DETAILED DESCRIPTION

Figure 1:
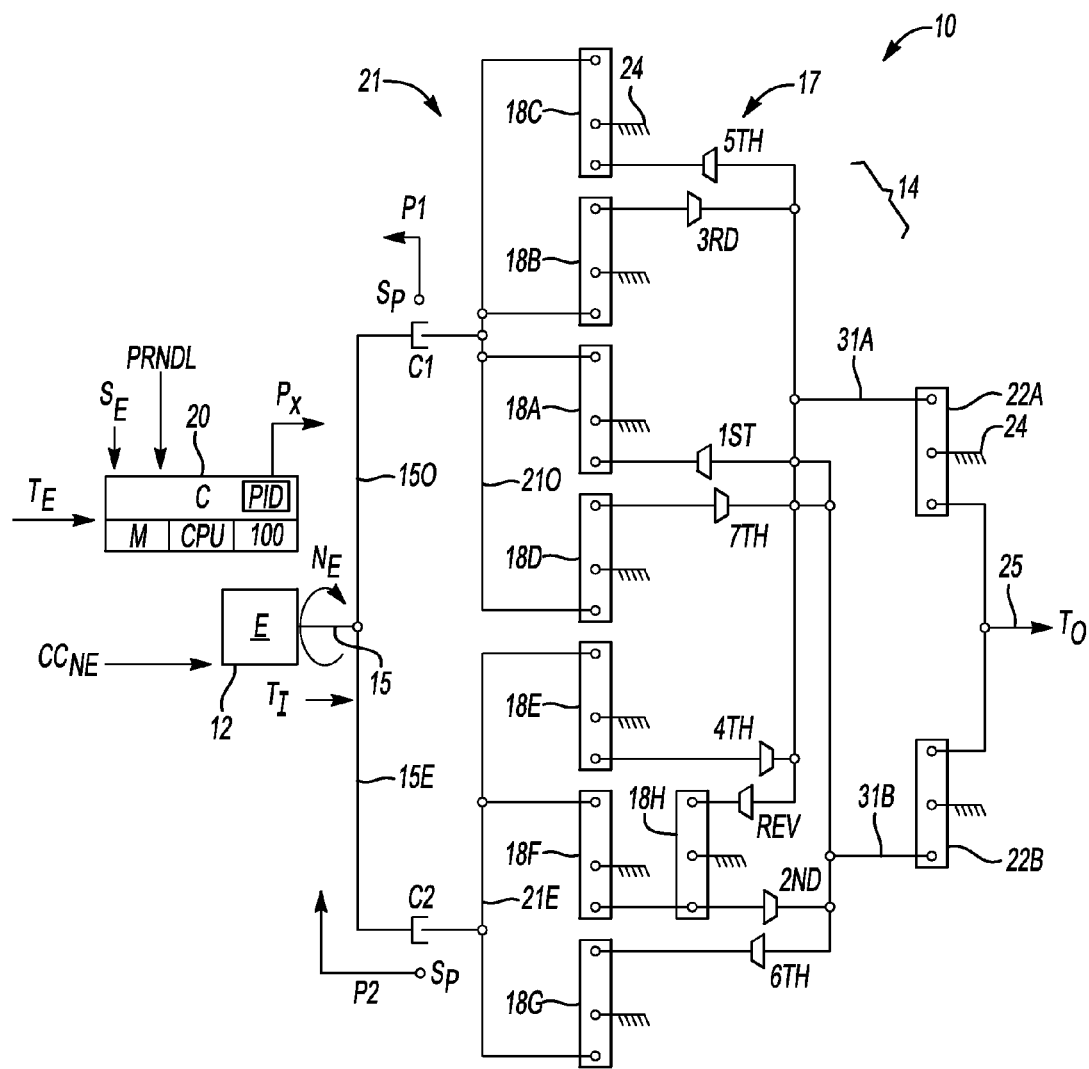
FIG. 1 is a schematic illustration of an example vehicle having a transmission, input clutches, and a controller programmed to learn the bite point of the input clutches using the approach described herein.

Referring to the drawings, wherein like reference numbers correspond to like or similar components throughout the several figures, an example vehicle 10 is shown schematically in FIG. 1. The vehicle 10 includes an internal combustion engine (E) 12 responsive to engine speed control signals (arrow $CC_{NE}$), a transmission 14, and a controller (C) 20. The engine 12, which has an output member 15 connected to odd and even shafts 15O and 15E, each rotating at engine speed (arrow $N_E$) to produce an input torque (arrow $T_I$), is selectively connected to an input member 21 of the transmission 14 via one or more position-controlled input clutches C1 and/or C2. The controller 20 is programmed to execute a method 100, an embodiment of which is described below with reference to FIG. 2, and to thereby learn the bite point of the two input clutches C1 and C2 in the non-limiting example dual-clutch transmission (DCT) embodiment of FIG. 1. For illustrative consistency, the transmission 14 of FIG. 1 will be referred to hereinafter as the DCT 14. However, the controller 20 may be used with any position-controlled clutches such as of the type used in automated manual transmissions which use only one input clutch.

As is well known in the art, a DCT such as the DCT 14 of FIG. 1 combines certain features of manual and automatic transmissions. A DCT may be of the dry or lubricated/wet variety, with a dry DCT lacking an engine-driven pump. In a DCT such as the DCT 14, a designated one of a pair of position-controlled input clutches is applied to engage, via clutch forks and associated clutch synchronizers 17, hereinafter referred to as clutch forks 17 for simplicity, the oddly-numbered gear sets 18A, 18B, 18C, and 18D, i.e., respective $1^{st}$, $3^{rd}$, $5^{th}$, and $7^{th}$ gears, each having a node connected to a stationary member 24 of the DCT 14 in the embodiment of FIG. 1, as arranged on a first/odd input shaft 21O in the example 7-speed DCT 14.

The other position-controlled input clutch is applied to engage the evenly-numbered gear sets 18E, 18F, 18G on a second/even input shaft 21E, e.g., $2^{nd}$, $4^{th}$, and $6^{th}$ gears. A reverse (REV) gear set 18H may be entered via engagement of the input clutch C2 in the example configuration shown in FIG. 1. While shown schematically in FIG. 1, the input clutches C1 and C2 include all required clutch structure as known in the art, i.e., a cylinder, piston, clutch plates with friction material, and a supply of hydraulic fluid under pressure, e.g., from an engine-driven main pump.

The linear positions of each of the input clutches C1 and C2, or rather of any clutch pistons or linear actuators used to apply the input clutches C1 and C2, may be measured via a corresponding clutch position sensor $S_P$, e.g., a Hall effect sensor. The measured clutch positions (arrows P1 and P2) are transmitted to the controller 20 over a controller area network (CAN) bus or other suitable communication pathway for use in control of the DCT 14, including in the execution of the method 100 as explained below with reference to FIG. 2.

The example DCT 14 also has an output member 25 that is connected to output shafts 31A and 31B of the respective oddly-numbered and evenly-numbered gear sets as shown, with via final drive gear sets 22A and 22B, to ultimately convey output torque (arrow $T_O$) to a set of drive wheels (not shown). The controller 20 commands the engagement of the required gear sets via application of the clutch engagement forks and synchronizers 17, as is well known in the art, for a next-selected gear state ahead of the impending shift. The shift is then commanded via a set of clutch position commands (arrow $P_X$) to whichever of the input clutch C1 or C2 is required for the particular shift. Therefore, a DCT can improve shift speed relative to shifts occurring in a conventional automatic transmission, typically with improved shift control and increased power.

The controller 20 of FIG. 1 selectively executes code or instructions embodying the present method 100, for instance by executing computer code or instructions recorded on tangible, non-transitory memory (M) using a processor (CPU), during certain threshold bite point learning entry conditions so as to accurately learn the clutch bite point of the two input clutches C1 and C2. Example vehicle parameters used for executing the method 100 of FIG. 2 are shown in FIG. 3, with a representative torque-to-position curve depicted in FIG. 4.

The controller 20 may be a transmission control module or an integrated transmission and engine control module, depending on the design, and may be configured as a microprocessor-based computer device having the CPU and memory M. The CPU may receive and process various vehicle parameters and control inputs, including an engine on/off state signal (arrow $S_E$), a PRNDL state (arrow PRNDL), and a reported engine torque (arrow $T_E$), i.e., an estimated or actual engine torque value, which is readily available from an engine control module or similar logic in an integrated controller 20, again depending on the desired design. The memory M may include optical or magnetic read only memory (ROM), random access memory (RAM), electrically-programmable read-only memory (EPROM), flash memory, and the like. The controller 20 may also include logic circuitry including but not limited to a high-speed clock, analog-to-digital (A/D) circuitry, digital-to-analog (D/A) circuitry, a digital signal processor or DSP, and the necessary input/output (I/O) devices and other signal conditioning and/or buffer circuitry.

The controller 20 also utilizes proportion-integral-derivative (PID) control logic for some of the required steps of the method 100 as explained below. As is well understood in the art, PID control refers to a control loop feedback mechanism and associated logic which uses three terms, i.e., the proportion (P), integral (I), and derivative (D) terms, with each representing the respective present, past, and future error values. Such logic may be useful in closed-loop control actions.

Figure 2:
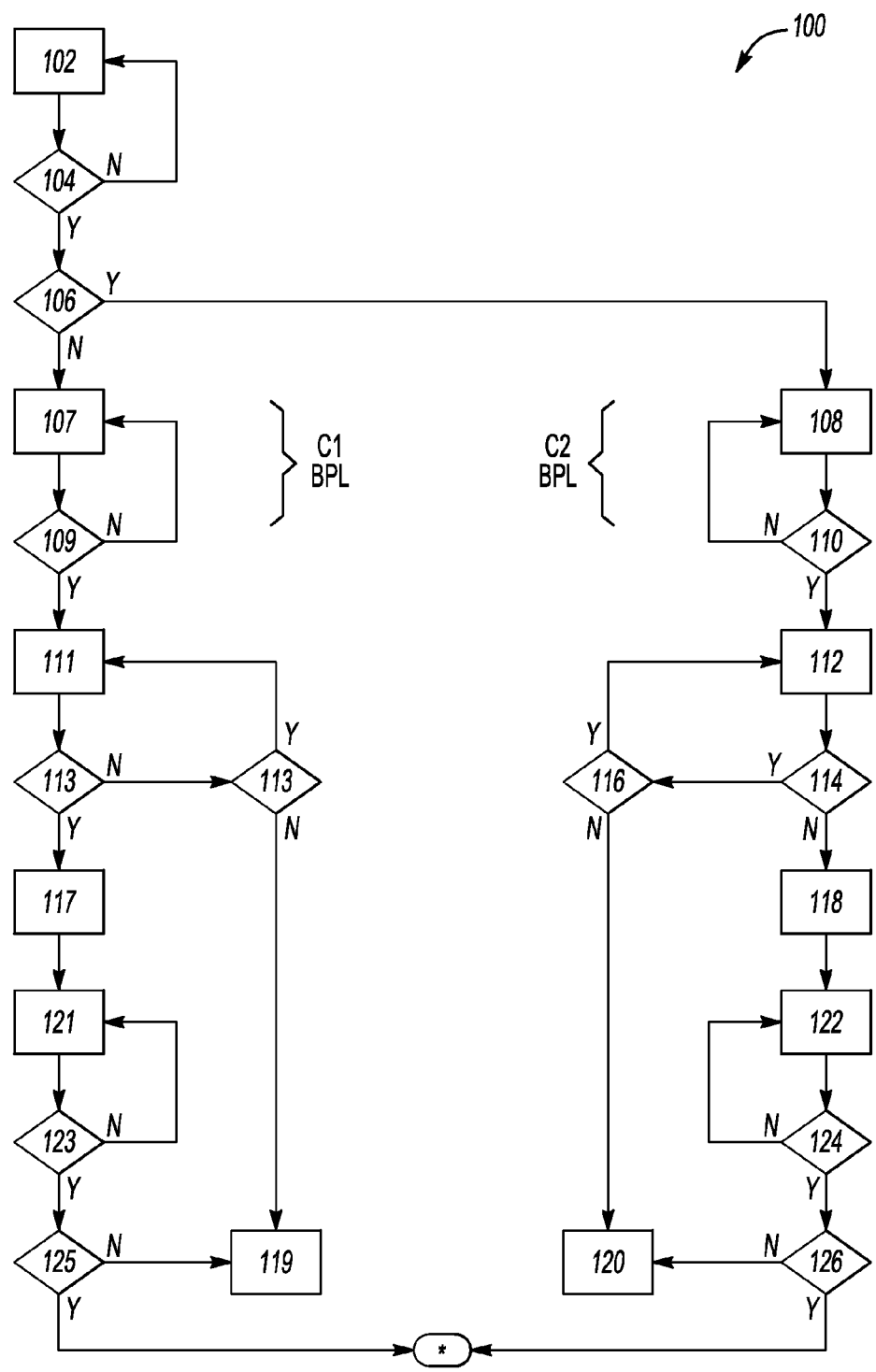
FIG. 2 is a flow chart describing an example method for learning the bite point of the input clutches shown in FIG. 1.
Figure 3:
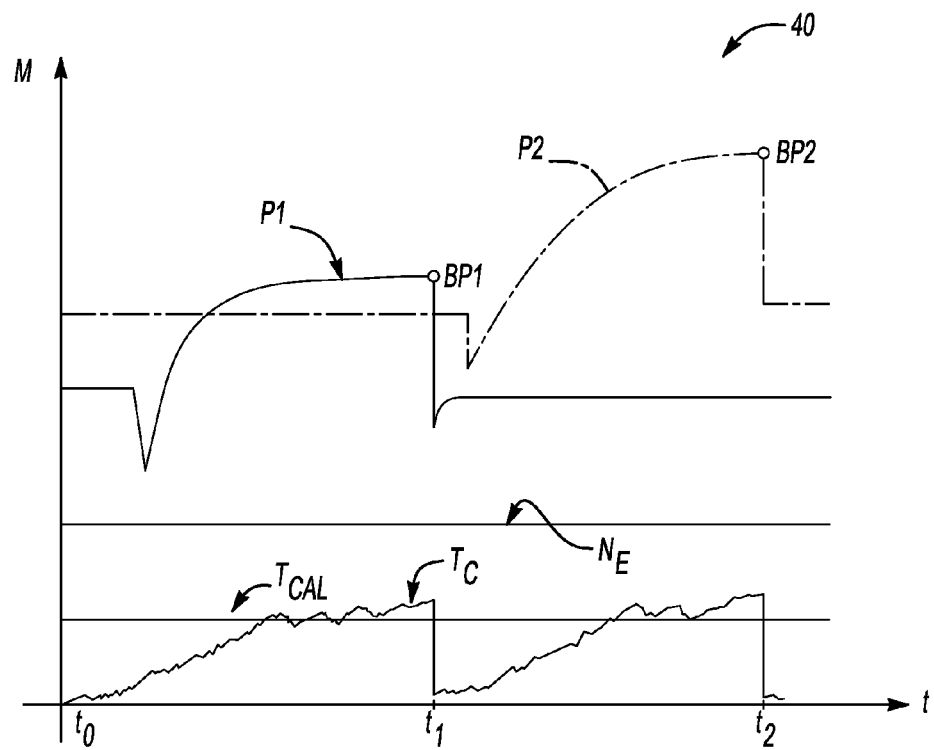
FIG. 3 is a time plot of example position and engine speed for the vehicle of FIG. 1, with time plotted on the horizontal axis and magnitude plotted on the vertical axis.

Referring to FIG. 2, an example embodiment of the method 100 begins at step 102, wherein the controller 20 receives and processes vehicle parameters, including the PRNDL state (arrow PRNDL) of the DCT 14 and the on/off engine state signal (arrow $S_E$), both of which are shown in FIG. 1. The method 100 then proceeds to step 104.

At step 104, the controller 20 next determines whether the vehicle parameters received and processed at step 102 are sufficient for proceeding with learning of the bite point of the input clutches C1 and C2. The bite point learning logic provided via the method 100 is triggered only when the DCT 14 of FIG. 1 is in park and the engine 12 is idling, e.g., while the vehicle 10 is present at the vehicle assembly plant when the car/engine is started for the first time, and/or at a service location post-sale. The method 100 proceeds to step 106 when the park/engine idle entry or enable conditions are met. Otherwise, the method 100 repeats step 102.

At step 106, the controller 20 of FIG. 1 may determine whether a bite point learning test of the input clutch C1 has already been completed. Such a step may include referencing a flag in memory M, or otherwise verifying that a bite point value has been recorded for the input clutch C1. The method 100 proceeds to step 108 to test the other input clutch C2 if the bite point of the first input clutch C1 has already been learned and recorded in memory M. Otherwise, the method 100 proceeds to step 107. For the remainder of the description of the method 100, the evenly-numbered method steps 108-126 correspond to the oddly-numbered steps 107-125, with the oddly-numbered steps being applicable to the input clutch C2. For illustrative clarity, therefore, the oddly-numbered and evenly-numbered steps of method 100 will be described together. FIG. 2 includes the labels "C1 BPL" and "C2 BPL" to indicate the start of the separate C1 bite point learn (BPL) and C2 BPL logic.

Steps 107 and 108 both include commanding engagement of a designated one of the clutch forks and synchronizers 17 on a corresponding one of the input shafts 21O and 21E shown in FIG. 1, i.e., with step 107 pertaining to the input shaft 21O and step 108 pertaining to the input shaft 21E. For instance, the controller 20 may command engagement of the forks and synchronizers 17 used for achieving $7^{th}$ gear at step 107, or engagement of the forks and synchronizers 17 used for achieving $6^{th}$ gear at step 108. Steps 107 and 108 also include enabling an engine speed request of the engine 12, whether in logic of the controller 20 or in that of a separate dedicated engine control module (not shown).

To load the powertrain with the engine 12, the controller 20 transmits the engine speed control signals ($CC_{NE}$) to the engine 12, or requests the transmission of such engine speed control signals ($CC_{NE}$) from an engine control module when the controller 20 is configured solely as a transmission controller, such that the engine 12 idles at a calibrated speed while in park. A suitable idle speed may be at or near 900 RPM, or any other constant speed in other embodiments. The method 100 proceeds to steps 109 or 110 for input clutches C1 and C2, respectively, and determines whether the designated forks and synchronizers 17 used on the input shaft 21O or 21E are fully engaged. Steps 107 and 109 for the input clutch C1 and steps 108 and 110 for the input clutch C2 are repeated until the designated forks and synchronizers 17 are fully engaged, at which point the method 100 proceeds to step 111 for the input clutch C1 or step 112 for the input clutch C2.

Steps 111 and 112 includes transmitting the clutch position control commands (arrow $P_X$ of FIG. 1) to the input clutch C1 or C2, respectively, and increasing or decreasing the linear clutch apply position of the input clutches C1 or C2 via the PID control logic of the controller 20. The goal of steps 111 and 112 is to move the respective input clutch C1 or C2 toward the calibrated torque capacity, for instance to or slightly above 15 Nm as noted above. Thus, steps 111 and 112 include calculating the clutch torque of the input clutches C1 and C2, e.g., as a function of reported engine torque (arrow $T_E$). For instance, the controller 20 may use the reported engine torque (arrow $T_E$) of FIG. 1 corresponding to the known engine torque for the calibrated engine speed (arrow $N_E$), and may subtract from this value the driveline inertial torque, i.e., the amount of input torque needed to overcome the inertia of the engine 12 and connected driveline components and begin rotating the odd and even shafts 15O and 15E of FIG. 1.

Figure 4:
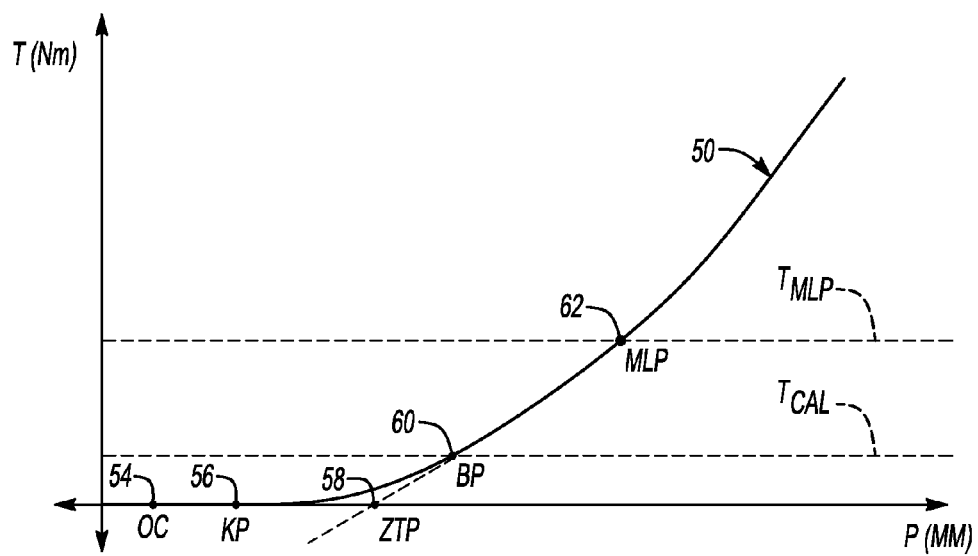
FIG. 4 is an example torque-to-position curve, with actuator position plotted on the horizontal axis and the corresponding clutch torque plotted on the vertical axis.

Referring briefly to FIG. 4, a representative torque-to-position curve 50 is shown with clutch apply position (P) in millimeters (mm) depicted on the horizontal axis and clutch torque capacity (T) in Nm depicted on the vertical axis. The calibrated torque capacity is represented as line $T_{CAL}$. Also plotted in FIG. 4 are the open clutch point (OC) 54, the kiss point (KP) 56 wherein the interfacing sides of the input clutch C1 just begin to touch, the zero torque point (ZTP) 58, i.e., a clutch position extrapolated from bite point (BP) 60 and commanded by the controller 20 whenever 0 Nm clutch torque is required/requested, and a minimum linear point (MLP) 62, which is where the torque-to-position relationship becomes linear. The MLP 62 has a corresponding torque value indicated by line $T_{MLP}$, e.g., about 60 Nm when $T_{CAL}$ is 15 Nm.

Steps 111 and 112 of the method 100 shown in FIG. 2 include applying the input clutch C1 or C2 starting at the learned kiss point, i.e., KP 56 of FIG. 4, using the closed-loop PID control of the controller 20 and the instantaneous and accumulated clutch torque errors. That is, the PID control logic of the controller 20 is used to increase or decrease a linear position of a piston or other clutch actuator of the input clutch C1 or C2 as needed so as to achieve the calibrated clutch torque capacity ($T_{CAL}$). The controller 20 calculates the clutch torque for input clutch C1 or C2, and then proceeds to steps 113 or 114 for the input clutches C1 and C2, respectively.

At steps 113 and 114, the controller 20 of FIG. 1 determines whether the calculated clutch torque capacity from steps 111 and 112 has reached the calibrated torque capacity ($T_{CAL}$). If not, the method 100 proceeds to step 115 from step 113, or to step 116 from step 114. Otherwise, the method 100 proceeds to step 117 or 118 for input clutches C1 and C2, respectively.

Steps 115 and 116 entail determining if the enable conditions of step 104 remain satisfied. If so, steps 111 and 112 are repeated for input clutches C1 and C2, respectively. If the enable conditions are no longer satisfied, the method 100 proceeds to steps 119 for the input clutch C1 or step 120 for the input clutch C2.

Steps 117 and 118 both include recording the linear position of the piston or other linear actuator used for applying the corresponding input clutch C1 or C2. For instance, the position sensors $S_P$ shown in FIG. 1 may transmit the measured clutch position (arrows P1 or P2) to the controller 20, where the received measured position is then recorded in memory (M). The method 100 then proceeds to steps 121 for input clutch C1 and step 122 for input clutch C2.

At steps 119 and 120, the bite point learning test of method 100 is aborted. All recorded information up to these steps may be cleared, and the forks and synchronizers 17 previously engaged at steps 107 and 108 are automatically disengaged and allowed to reset to neutral. The method 100 may begin anew at step 102.

Steps 121 and 122, which are executed after recording the clutch positions P1 or P2 at respective steps 117 and 118, include commanding the forks and synchronizers 17 that were previously engaged at steps 107 or 108 to disengage and return to neutral. For the input clutch C1, the method 100 then proceeds to step 123, while step 124 is executed for the input clutch C2.

At steps 123 and 124, the controller 20 of FIG. 1 determines whether the forks and synchronizers 17 from respective steps 107 and 108 have returned to neutral, i.e., are no longer engaged, such as by verifying the position of the forks and/or of line pressure feeding the forks. The controller 20 repeats steps 121 and 123 for the input clutch C1 until the designated fork is once again in neutral, and then proceeds to step 125. Likewise, for input clutch C2 the controller 20 repeats steps 122 and 124 until the fork of step 108 is in neutral, and then proceeds to step 126.

Steps 125 and 126 include verifying that the bite point learning test of input clutch C1 or C2 is complete. The method 100 is finished, as indicated by * in FIG. 2, or the method 100 may start anew at step 102 during a service call if needed, if the test is complete. Otherwise, the method 100 may proceed to step 119 or 120 and abort the test as explained above. However, such an outcome is unlikely to occur given the successful completion of steps 117, 121, and 123 for clutch C1 or steps 118, 122, and 124 for clutch C2.

Referring to FIG. 3, the bite point learning test provided by method 100 and the controller 20 is depicted graphically via a time plot 40, with time (t) plotted on the horizontal axis and magnitude (M) plotted on the vertical axis. Engine speed (trace $N_E$) set at steps 107 and 108 of FIG. 3 is held steady, e.g., at or near 900 RPM, and steps 111 and 112 result in the change of measured clutch positions P1 and P2. As the clutch positions P1 and P2 change, the clutch torque (trace $T_C$) begins to rise.

In FIG. 3, the clutch torque (trace $T_C$) calculated by the controller 20 between $t_0$ and $t_1$ corresponds to the torque capacity of the input clutch C1, while the clutch torque (trace $T_C$) in the duration $t_1$-$t_2$ corresponds to the torque capacity of the input clutch C2. Clutch torque (trace $T_C$) begins to rise toward and eventually surpasses the calibrated torque capacity (trace $T_{CAL}$).

The controller 20 then maintains the clutch positions P1 and P2 via PID control logic for a calibrated amount of time after the calculated clutch torque (trace $T_C$) stabilizes at or slightly above the calibrated torque capacity ($T_{CAL}$). The controller 20 thereafter records the corresponding bite points (BP1, BP2) for the input clutches C1 and C2, respectively, when this occurs, as explained above with reference to steps 117 and 118 of FIG. 2.

Once the bite points (BP1, BP2) of both input clutches C1 and C2 have been learned, which may take approximately 7-10 seconds for each input clutch C1 and C2, the controller 20 executes a control action with respect to the DCT 14 using the learned bite points (BP1, BP2). For example, the controller 20 may update the curve 50 of FIG. 4 with the correct bite points, and thereafter use the curve 50 to control the DCT 14 in all subsequent shifts.

While the best modes for carrying out the invention have been described in detail, those familiar with the art to which this invention relates will recognize various alternative designs and embodiments for practicing the invention within the scope of the appended claims.

The invention claimed is:

1. A method for learning a clutch bite point of a position-controlled clutch in a vehicle having an engine and a transmission, the method comprising:
   commanding an engagement of a clutch fork in the transmission via a controller having a memory when the transmission is in a park state and the engine is idling;
   controlling an apply position of the position-controlled clutch via the controller;
   calculating a clutch torque capacity of the position-controlled clutch while controlling the apply position;
   measuring the apply position via a position sensor when the calculated clutch torque capacity equals a calibrated clutch torque capacity;
   recording the measured apply position as the clutch bite point in the memory of the controller; and
   controlling the transmission using the clutch bite point.

2. The method of claim 1, wherein controlling an apply position of the position-controlled clutch includes using proportional-integral-derivative (PID) control logic of the controller to increase or decrease a linear position of a clutch actuator as needed to achieve the calibrated clutch torque capacity.

3. The method of claim 1, wherein calculating a clutch torque capacity includes calculating the clutch torque capacity as a function of a reported torque of the engine.

4. The method of claim 3, wherein the function includes subtracting an inertial torque value from the reported torque.

5. The method of claim 1, wherein the transmission is a dual-clutch transmission and the position-controlled clutch includes a pair of input clutches connecting the engine to the dual-clutch transmission, and wherein the method is separately conducted for each of the pair of input clutches.

6. The method of claim 1, wherein recording the measured apply position as the clutch bite point includes recording the clutch bite point in a torque-to-position lookup curve that is accessible by the controller.

7. A system for a vehicle having an engine, comprising:
   a position-controlled input clutch;
   a position sensor positioned with respect to the position-controlled input clutch;
   gear sets each selected via a corresponding one of a plurality of clutch forks;
   a transmission having an input member that is selectively connected to the engine via the position-controlled input clutch; and
   a controller having a memory programmed to learn a bite point of the position-controlled input clutch, wherein the controller executes instructions from the memory to thereby:
      command an engagement of one of the plurality of clutch forks when the transmission is in a park state and the engine is running;
      control an apply position of the position-controlled input clutch via the controller;
      calculate a clutch torque capacity of the position-controlled input clutch while controlling the apply position;
      measure the apply position using the position sensor when the calculated clutch torque capacity equals a calibrated clutch torque capacity;
      record the measured apply position as a clutch bite point in the memory; and
      control the transmission using the clutch bite point.

8. The system of claim 7, wherein the controller includes proportional-integral-derivative (PID) control logic, and is programmed to control an apply position of the position-controlled input clutch using the PID control logic by increasing or decreasing a linear position of a clutch actuator sufficiently to achieve the calibrated clutch torque capacity.

9. The system of claim 7, wherein the controller receives a reported engine torque and calculates the clutch torque capacity as a function of the reported engine torque.

10. The system of claim 9, wherein the function includes subtracting an inertial torque value from the reported engine torque.

11. The system of claim 7, wherein the transmission is a dual-clutch transmission and the positioned-controlled input clutch is one of two input clutches connecting the engine to the dual-clutch transmission.

12. A vehicle comprising:
   an internal combustion engine;
   a position-controlled input clutch;
   a position sensor positioned with respect to the position-controlled input clutch;
   a transmission having:
      a plurality of gear sets, each of which is selected via a corresponding clutch fork of a plurality of clutch forks; and
      an input member that is selectively connected to the engine via the position-controlled input clutch; and
   a controller in communication with the position-controlled input clutch and the engine, and programmed to learn a clutch bite point of the position-controlled input clutch, wherein the controller executes instructions from a memory to thereby:
      command an engagement of one of the plurality of clutch forks when the transmission is in a park state and the engine is idling;
      control an apply position of the position-controlled input clutch via the controller;
      calculate a clutch torque capacity of the position-controlled input clutch while controlling the apply position;
      measure the apply position using the position sensor when the calculated clutch torque capacity equals a calibrated clutch torque capacity;
      record the measured apply position as a clutch bite point in the memory; and
      control the transmission using the clutch bite point.

13. The vehicle of claim 12, wherein the controller includes proportional-integral-derivative (PID) control logic, and is programmed to control an apply position of the clutch using the PID control logic by increasing or decreasing a linear position of a clutch actuator.

14. The vehicle of claim 12, wherein the controller receives a reported engine torque and calculates the clutch torque capacity as a function of the reported engine torque.

15. The vehicle of claim 14, wherein the function includes subtracting an inertial torque value from the reported engine torque.

16. The vehicle of claim 12, wherein the transmission is a dual-clutch transmission and the position-controlled input clutch is one of two input clutches connecting the engine to the dual-clutch transmission.

* * * * *